United States Patent [19]

Blomberg et al.

[11] Patent Number: 5,715,981
[45] Date of Patent: Feb. 10, 1998

[54] RAILS FOR CAR ROOFS

[75] Inventors: Harald Blomberg; Olaf Pöter, both of Wuppertal; Alfred Scholl, Mühlheim, all of Germany

[73] Assignee: Erbslöh AG, Velbert, Germany

[21] Appl. No.: 628,716

[22] PCT Filed: Oct. 6, 1994

[86] PCT No.: PCT/EP94/03303

§ 371 Date: Apr. 10, 1996

§ 102(e) Date: Apr. 10, 1996

[87] PCT Pub. No.: WO95/11144

PCT Pub. Date: Apr. 27, 1995

[30] Foreign Application Priority Data

Oct. 18, 1993 [DE] Germany ............ 93 15 848 U
May 10, 1994 [DE] Germany ............ 94 07 765 U

[51] Int. Cl.[6] .................................................. B60R 9/04
[52] U.S. Cl. ................. 224/326; 224/309; 224/325; 114/364
[58] Field of Search ........................ 224/309, 314, 224/321, 322, 325, 326, 327, 317; 296/91; 114/364, 343

[56] References Cited

U.S. PATENT DOCUMENTS

| | | | |
|---|---|---|---|
| 3,931,919 | 1/1976 | Gerber et al. | 224/323 |
| 4,266,708 | 5/1981 | Bott | 224/326 |
| 4,673,119 | 6/1987 | Bott | 224/309 |
| 5,016,799 | 5/1991 | Stapleton | 224/309 |
| 5,069,377 | 12/1991 | Baughman | 224/321 |
| 5,071,050 | 12/1991 | Pudney et al. | 224/322 |
| 5,411,196 | 5/1995 | Lee, Jr. et al. | 224/321 |

FOREIGN PATENT DOCUMENTS

| | | | |
|---|---|---|---|
| A 0 580 023 | 1/1994 | European Pat. Off. | |
| 29 39 671 | 4/1981 | Germany . | |
| 30 04 447 | 8/1981 | Germany . | |
| 82 31 689 | 4/1983 | Germany . | |
| 3230346 A | 2/1984 | Germany | 224/309 |
| 3814799 | 11/1988 | Germany | 224/325 |
| 91 11 507 | 1/1992 | Germany . | |
| 9111655 U | 1/1992 | Germany . | |
| OS 40 04 829 | 2/1992 | Germany . | |
| OS 40 28 433 | 2/1992 | Germany . | |
| 42 23 898 | 1/1994 | Germany . | |
| 35 39 449 | 5/1997 | Germany . | |
| 406032178 A | 2/1994 | Japan | 224/309 |

*Primary Examiner*—David J. Walczak
*Assistant Examiner*—Gregory M. Vidovich
*Attorney, Agent, or Firm*—McGlew and Tuttle

[57] ABSTRACT

The present invention deals with the problem of changing the design of the roof rails, which have hitherto been of a multipart design, in such a way that they can be manufactured in a simple manner and at a lower cost. This is achieved according to the present invention by the spar and the feet including one component, which is preferably formed by a deformed hollow chamber section. To achieve this, the hollow chamber section is deformed downward in a gentle arch at its end. The deformed bent section is cut off on the underside obliquely to the curved longitudinal axis of the section. The bottom of the hollow chamber section is then pressed in from below, so that an omega-shaped cross section is formed. The roof rail thus prepared has a consistently elegant shape, which does not reveal how it was made.

20 Claims, 7 Drawing Sheets

1

RAILS FOR CAR ROOFS

FIELD OF THE INVENTION

The present invention pertains to a roof rail for vehicles and in particular to a roof rail where a spar is bent off at the ends to form feet and these feet are attached to the roof surface.

BACKGROUND OF THE INVENTION

A roof rail has been known from DE-OS 40 04 829 or DE-OS 40 28 433. The spar and the two end-side feet of the roof rail are designed as individual parts. The spar consists of a hollow chamber section, while the two feet are designed as forged parts or castings. The feet can be screwed to the roof of the vehicle directly or via adapters. The prior-art arrangements have the drawback that the connection points between the spar and the feet raise problems in terms of tolerance, and gaps that may possibly be formed are undesirable for appearance reasons. The connection points also have only a limited load-bearing capacity despite the positive-locking guiding of the pins.

EP-A 0 580 023, which has just been recently published, describes a 1-piece roof rail including a hollow chamber section made of light metal with bent off feet.

It has been known from DE-U 91 11 655.4 a roof rack which describes a connecting pin which can be screwed down in cup-shaped depressions in the sheet metal of a roof frame. The part of the pin projecting over the roof has a conical taper, whose purpose is not described. A rail spar is represented schematically which is connected to the pin via a setscrew.

SUMMARY AND OBJECTS OF THE INVENTION

The object of the present invention is to provide a more suitable design for a roof rail.

The roof rail according to the present invention is made in one piece with the spar and the two feet and it consists of a hollow chamber section throughout, which acquires the necessary shape and also strength due to a suitable deformation. The deformation is different in the foot area and in the spar area.

The foot is formed by a downwardly directed bent section of the hollow chamber section, which is cut off obliquely on the end side. As a result, the foot has an enlarged contact surface and also a downwardly open hollow space, into which a support part can be inserted. The support part can establish the connection to the vehicle roof directly or indirectly via an adapter. It is guided for this purpose in a positive-locking manner in the hollow space of the foot. In the case of a suitable shaping with a pointed beak, which engages a narrowed area at the transition of the foot into the spar, it is possible to establish a tensioned locking, which fixes the roof rail especially well and is also able to absorb tolerances. The permissible tolerance range can be even increased via a suitable wedge angle.

The deformation of the hollow section consists, besides the bending in the foot area, preferably also of an arching of the bottom directed toward the interior, which arching may also differ greatly over the length of the section. This deformation is located on the underside of the section and is invisible or hardly visible from the outside on the mounted roof rail. It does not affect the outer surfaces of the roof rail located in the range of vision, so that no structural changes occur here, and no finishing work is necessary. The narrowed area of the hollow space at the transition from the foot to the spar can be formed in a simple manner via the arching of the bottom. In addition, the width of the spar is set by shortening the side walls to the desired size. Furthermore, the arching of the bottom offers a favorable and almost invisible possibility of fastening for middle feet. As an alternative, the middle feet may also be made in one piece with the spar by not providing any bottom arch in this area of the section.

The roof rail according to the present invention can be manufactured simply and at a favorable cost. The tolerance problems are markedly reduced compared with the state of the art. In addition, the roof rail according to the present invention has uniform material properties and a uniform appearance due to its one-piece design. It can also be subjected to surface treatment more easily and better. While different materials are used for the spar and the feet according to the state of the art, which often leads to deviations in color, different surface structures and other optically unfavorable appearances, these problems do not occur with the one-piece roof rail according to the present invention.

The foot opening is preferably formed by cutting the bent off section along a line which is substantially parallel to the longitudinal axis of the spar. This cut off line can either be aligned with the outside of the spar, or spaced away from the outside of the spar. The foot opening is then flush with a mounting surface that it parallel to the longitudinal axis of the spar. The portion of the spar which is adjacent the mounting surface is deformed in an arch extending along the longitudinal axis of the spar and opening towards the mounting surface. This forming of the spar arch causes the side walls of the spar which are substantially perpendicular to the mounting surface to be shortened and strengthened. This forming of the arch also provides space between the spar and the mounting surface.

It is also desirable to have the foot opening or the surface part positioned so that there is a wedge angle between the support part or the foot opening and the mounting surface when the spar is in its proper angular position with respect to the mounting surface. In this way when the foot or the surface part is mounted to the mounting surface, the foot or surface part rotates slightly and applies a force to this spar to help secure the spar.

The present invention also deals with the problem of making it possible to mount a roof rail of the above-described type or another roof rail, e.g., one designed according to the state of the art, in a simple manner without the need to have the job done by a specialized workshop.

The basic object of this additional problem is to develop a device for the detachable fastening of the rail on the vehicle surface, which makes mounting and removal possible from the outside of the vehicle, where mounting and removal can be carried out with ease, and reliable holding of the roof rail on the vehicle without recognizability of the fastening means is yet ensured.

A connecting pin is mounted on the mounting surface and extends from the mounting surface. The connecting pin is conically tapered and defines a blind hole. The support part includes a fitting mount which defines a conically tapered hole for receiving the connecting pin. The fitting mount also includes a locking pin radially movable, with respect to the connecting pin, into and out of the blind hole. In this way the rail and the support part are mounted on top of the connecting pin and the locking pin is moved into the blind hole to secure the rail to the mounting surface.

The present invention is based on the fact that the connecting pin on the vehicle surface, especially on the roof surface, is premounted at the factory and consequently projects from the surface. The roof rail, which is usually manufactured by accessory suppliers of the vehicle manufacturer and is supplied in a ready-to-mount state, needs only be placed on the connecting pins from above, and the mount is preferably locked automatically on the conical connecting pin.

DE-U 91 11 655.4 describes structure which relates to the connecting pin. However the relationships with the remaining structure of the present invention is not described and the corresponding advantages obtained are also not achieved.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
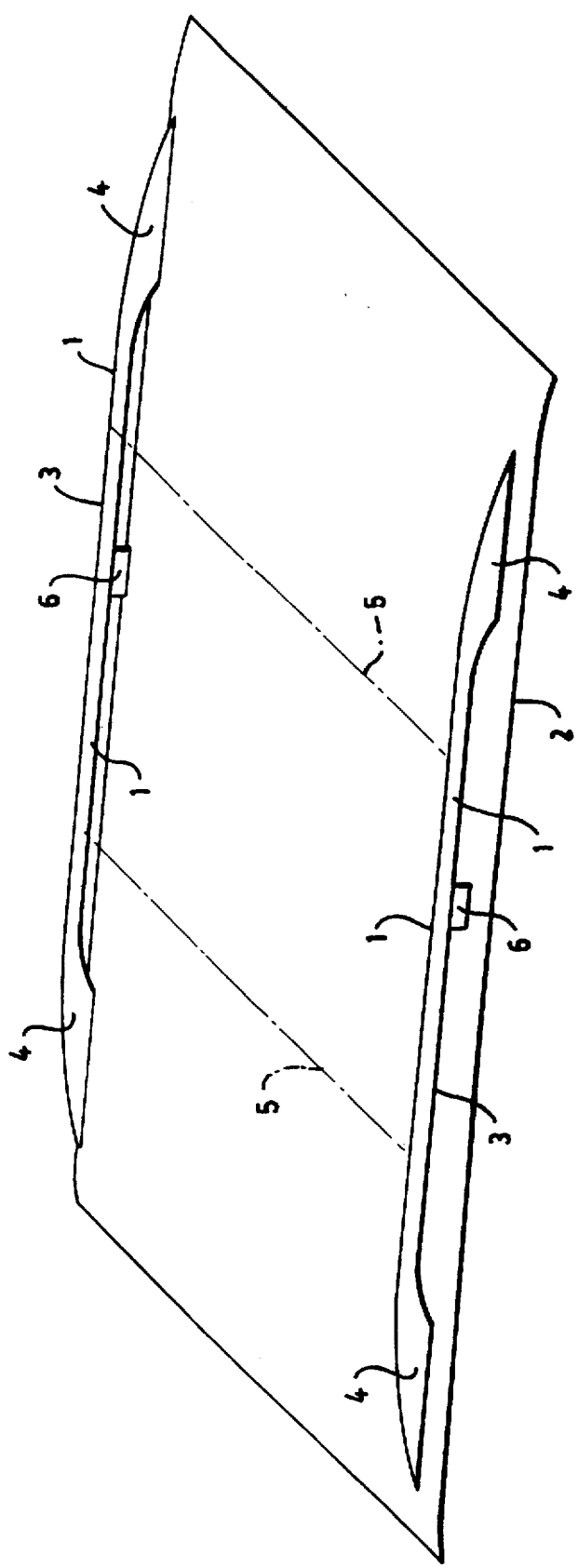
FIG. 1 is a schematic and perspective representation of a vehicle roof with two roof rails.

Referring to the drawings, FIG. 1 shows a perspective representation of a vehicle roof 2 of a passenger car. A roof rail 1 is mounted on both sides of the roof 2. Each roof rail 1 comprises a longitudinally extending spar 3 which passes over, at both ends and in one piece, into a foot 4 made in one piece with it. The roof rail 1 is fastened to the vehicle roof 2 by the foot or feet 4. One or more middle, or intermediate, supports 6 may be provided in the middle area of the roof rail 1. Crossbeams 5 for luggage racks, bicycle racks, etc., may be mounted between the two roof rails 1. The spars 3 have suitable mounts for this purpose, which are not shown more specifically.

The roof rail 1 is suitable for any vehicle, e.g., even for boats or the like. It may be mounted permanently and is also suitable for other purposes, e.g., as a handrail.

Figure 2:
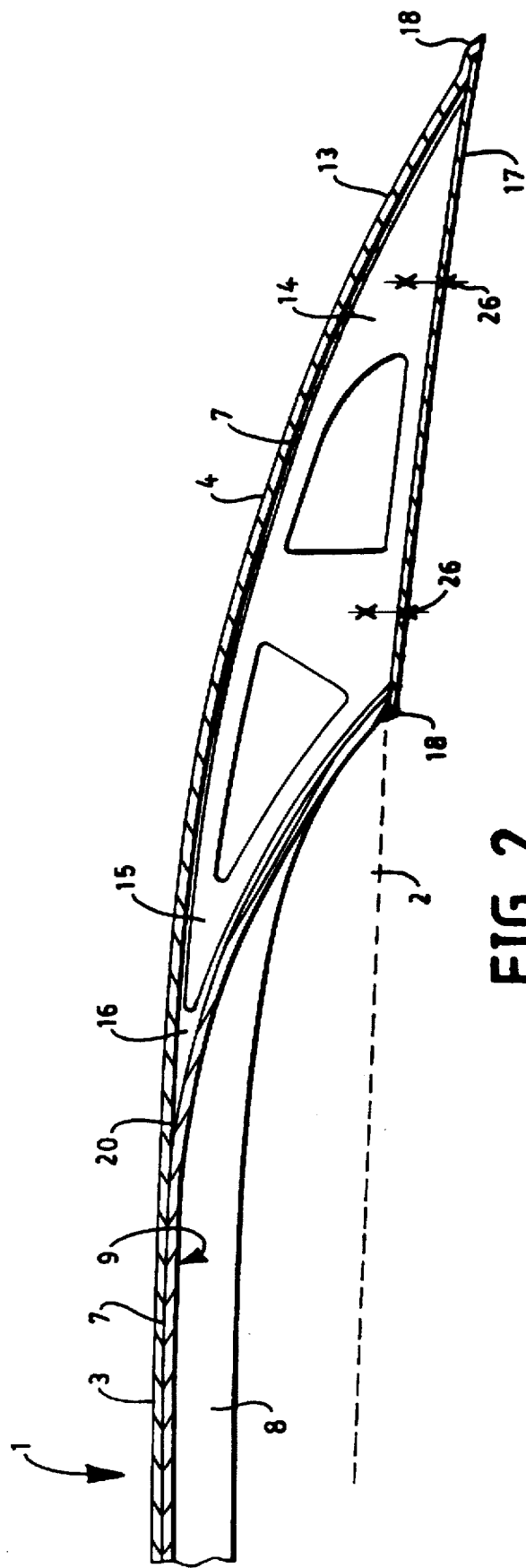
FIG. 2 is a cutaway longitudinal section through the foot area and the spar transition of the roof rail.

FIG. 2 shows a cutaway longitudinal section of the connection between the roof rail 1 and the vehicle roof 2. The roof rail 1 is formed with a deformed hollow chamber section 7. In the preferred exemplary embodiment, the hollow chamber section 7 has only one hollow space and has, at least in the basic form shown in greater detail in FIGS. 3 and 4, an essentially partially oval, tubular cross section.

The hollow chamber section 7 is made of light metal, preferably aluminum or an aluminum alloy. It is designed as an extruded section, but it may also be designed as a drawn section or as a section made in another way. In a variant of the embodiment shown, the hollow chamber section 7 may also have a plurality of inner hollow spaces, ribs, outside flanges or another suitable shape.

Figure 3:
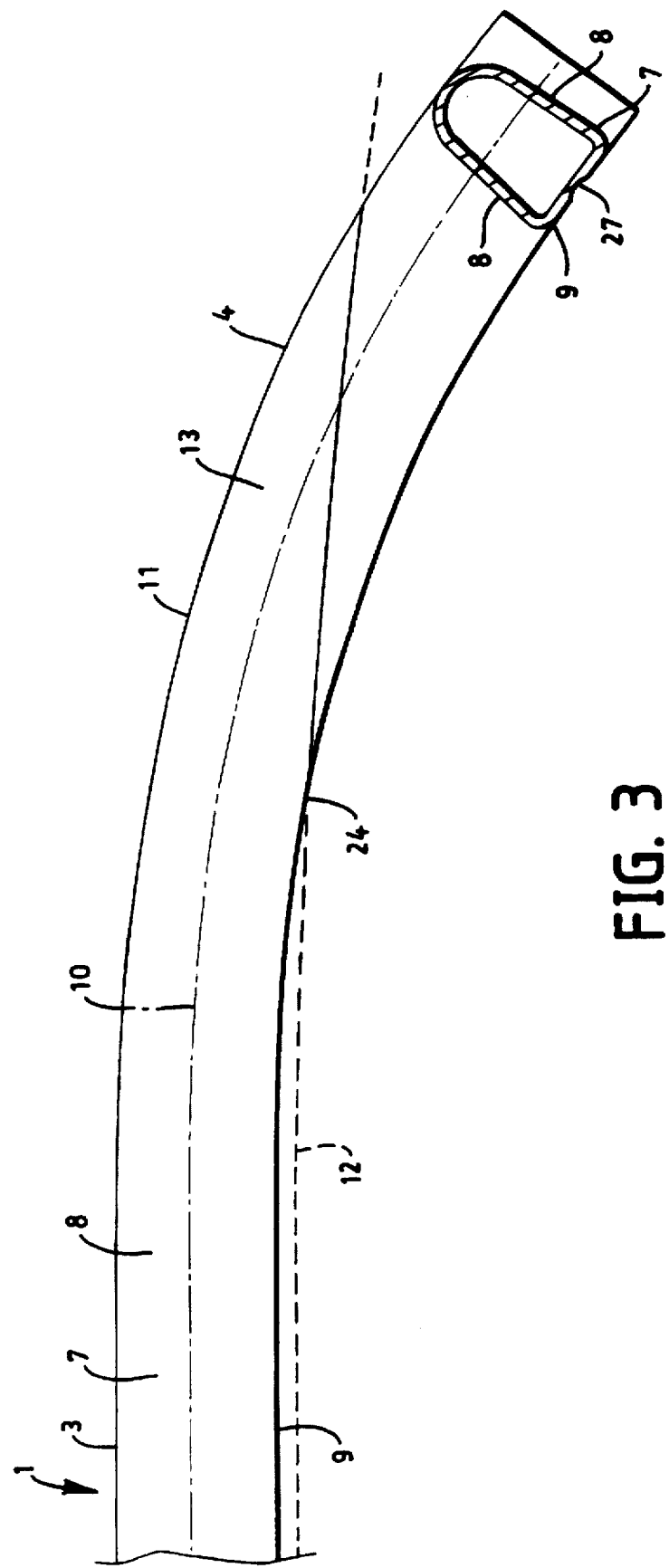
FIGS. 3 and 4 are side views of the roof rail in two stages of deformation.
Figure 4:
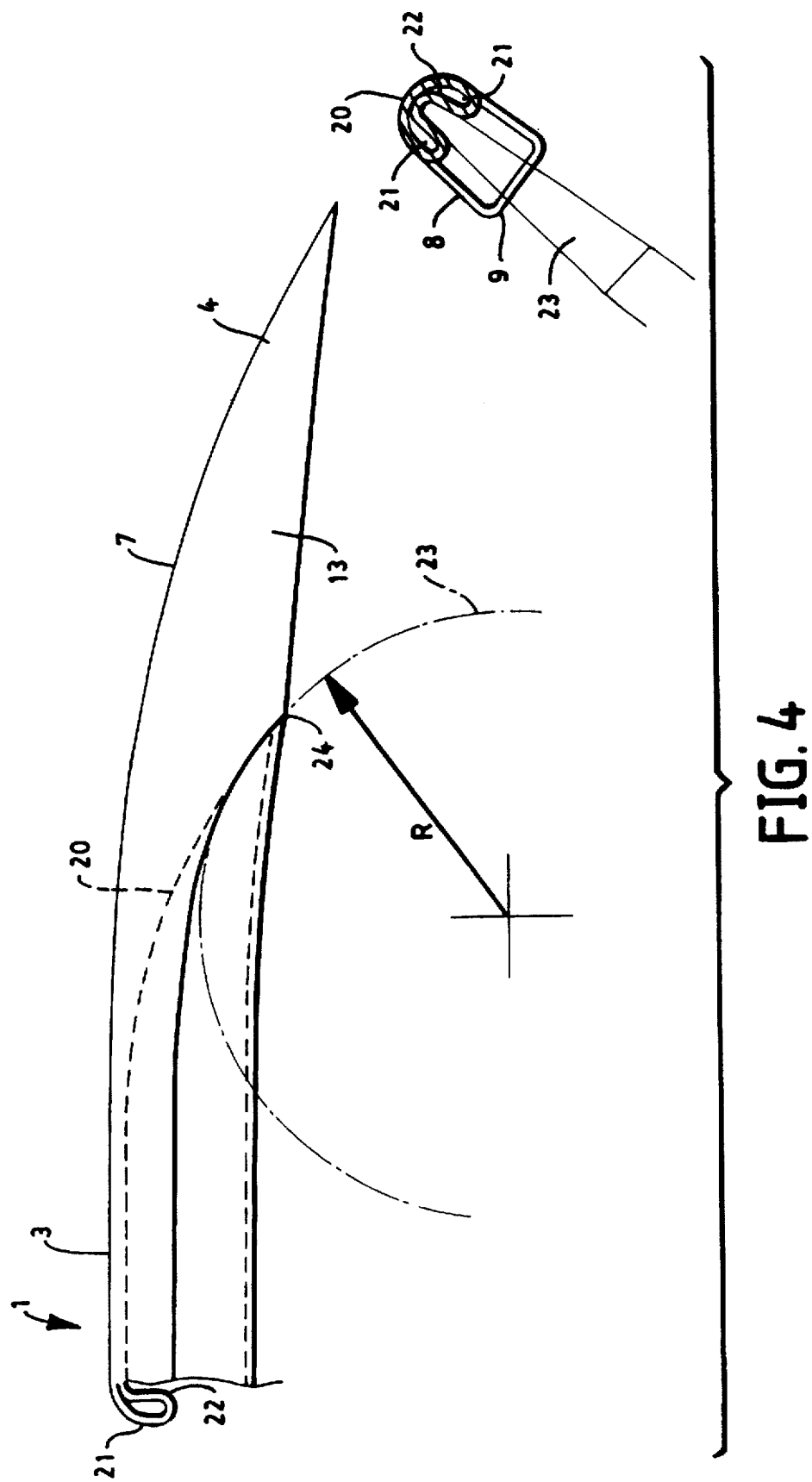

FIGS. 3 and 4 illustrate the process and the deformation steps of the manufacture of the final shape shown in FIG. 2.

To prepare the foot 4, the hollow chamber section 7 is first deformed slightly downwardly in a gentle arch according to FIG. 3. This bent section 11 is then cut off at the end obliquely to the curved longitudinal axis 10 of the section on the underside, or it can be severed in another way. The cutting line is designated by reference number 12. The bottom 9 of the hollow chamber section 7 is removed with the oblique cut. A hollow foot space 13 with a large access foot opening is formed in the foot 4. The bottom 9 of the hollow chamber section 7 ends at a foot edge 24.

In another deformation step according to FIG. 4, the hollow chamber section 7 receives a bottom or spar arch 20. Beginning from the foot edge 24, the bottom 9 is centrally impressed or rolled in from below with a suitable bending tool 23, and it is deformed in an omega-shaped pattern in the process. The bottom arch 20 is directed toward the interior of the hollow chamber section 7. It begins at the inner foot edge 24 and rises in the area of the foot 4 to the transition into the straight spar 3. As a result, the hollow space 13 receives a beak-shaped narrowed area 16 shown in FIG. 2. In the area of the spar, the arched-up bottom 9 is in contact with the roof of the hollow chamber section 7 or is relatively close to it.

As is illustrated in the cross-sectional representations in the fight-hand parts of FIGS. 3 and 4, the bottom 9 has a weakened area 27 in the middle, which facilitates deformation. The side walls 8 of the hollow chamber section 7 are shortened during the pushing up and arching in of the bottom 9, and they still have about half the width at, e.g., the spar 3. Wall loops 21 are now formed on both sides of the bottom arch 20. A certain hollow space is left between the remaining side walls 8 and the inner wall 22 of the bottom arch 20. This hollow space permits certain deformations of the inner walls 22 to take place for the following reasons, explained in connection with FIG. 5.

A narrowing of the spar 3 compared with the foot 4 is created via the bottom arch 20. In addition, the desired distance is obtained between the underside of the spar 3 and the vehicle roof 2. The bottom arch 20 also reinforces the roof rail 1.

As is illustrated in FIG. 4, the bending tool 23 has a symmetrical wedge-shaped cross section with rounded tip. It may be designed as an upright round disk, which is moved toward the hollow chamber section 7. However, it is more preferable to carry out the deformation by means of a single-stage or two-stage embossing die, e.g., a reverse draw punch. The deformation has its maximum and is uniform in the straight area of the spar.

In the preferred exemplary embodiment, the hollow chamber section 7 is first bent 11 according to FIG. 3. The bottom arch 20 is then pressed in according to FIG. 4, and the hollow chamber section 7 is cut off lengthwise 12 only thereafter. However, the cutting may also be performed before arching the bottom.

To fasten the roof rail 1, a support part 14 is introduced into the hollow foot space 13. The support part 14 is adapted to the inner shape of the hollow space 13 and is guided therein in a positive-locking manner. It is preferably in contact with the inner walls of the foot 4 over its entire surface or it is at least located at a closely spaced location therefrom. At the front end, the support part 14 has a pointed beak 15, which engages the narrowed area 16. During the fastening of the support part 14 on the vehicle roof 2, the beak 15 can be tensioned or forced in the narrowed area 16 and fix the foot 4 by positive locking in all directions.

The support part 14 has a bottom plate 17, which lies on the vehicle roof 2 and is fastened by means of tensionable connection elements 26, preferably in the form of bolts introduced from the bottom. Rubber plates or other sealing elements may be clamped in if desired. The rubber plates may have, e.g., an edge 18, which surrounds the foot 4 on the outside and seals it.

Figure 6:
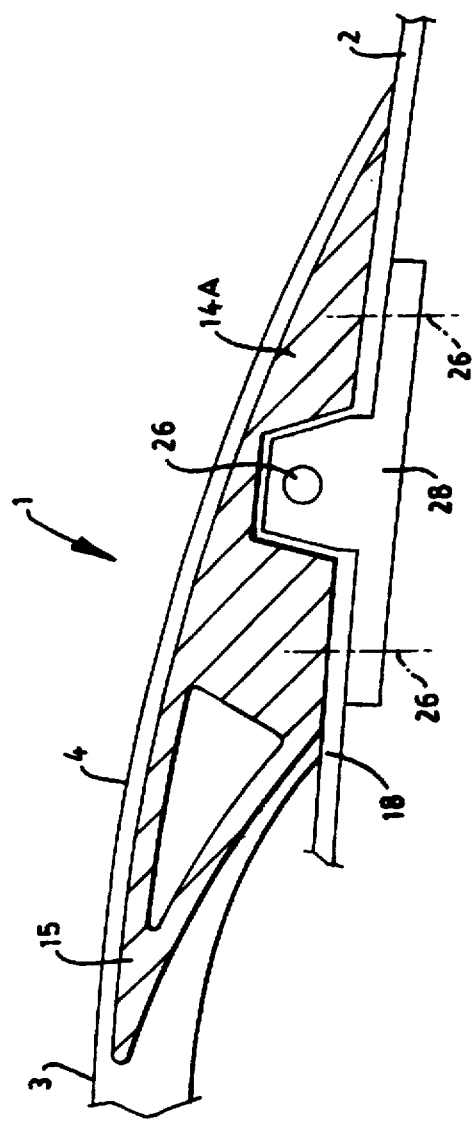
FIG. 6 is a side view of an alternative of the support part in the foot area with the fastening of the roof rail.

FIG. 6 shows a variant, in which 9 support part 14A is additionally fastened at the foot 4 by an inserted and tensionable connection element 26, e.g., a bolt directed in the transverse direction, a rivet, or the like. In addition, the support part 14A may be fastened to the vehicle roof 2 via an intermediate adapter 28. The adapter 28 may also be connected to the connection element 26 and it may engage the support part 14A, e.g., via a wedge guide. The possibility of a certain relative movement may be given in order to compensate tolerances in fastening.

Figure 5:
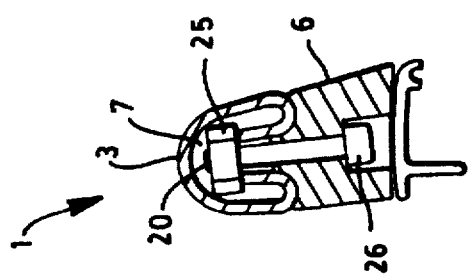
FIG. 5 is a cross section through the roof rail and a middle support.

FIG. 5 illustrates the design and the fastening of the middle supports 6 mentioned in the introduction. A hammer head plate 25 is introduced into the groove formed by the bottom arch 20. This plate preferably has a rectangular or oval shape. As a result, it can be introduced into the bottom arch 20 with the narrow sides from below and subsequently rotated. The oblong hammer head plate 25 is brought by the rotation into the transverse position and it thus deforms the inner walls 22 of the wall loops 21. As a result, the hammer head plate 25 is fixed in the spar 3 or the hollow chamber section 7 in a positive-locking manner.

The middle supports 6 are adapted to the deformed shape of the hollow chamber sections 7 and the shape of the spars 3 and surround these at least partially in a positive-locking manner. A connection element 26, which is in connection with the hammer head plate 25, is located on the inside. It is preferably a bolt, which is screwed from below through the middle support 6 and into a corresponding female thread at the hammer head plate 25. The middle support 6 is in turn fastened to the vehicle roof 2, e.g., to a roof trim or the like, in a suitable manner.

As an alternative, the middle supports 6 may also be made in one piece with the roof rail. The bottom arch 20 is abandoned in the area of the spar in this case. The extension of the hollow chamber section 7 remains the same and extends to the vehicle roof 2. It is then joined by the bottom arches 20 on both sides of the middle support 6.

Figure 7:
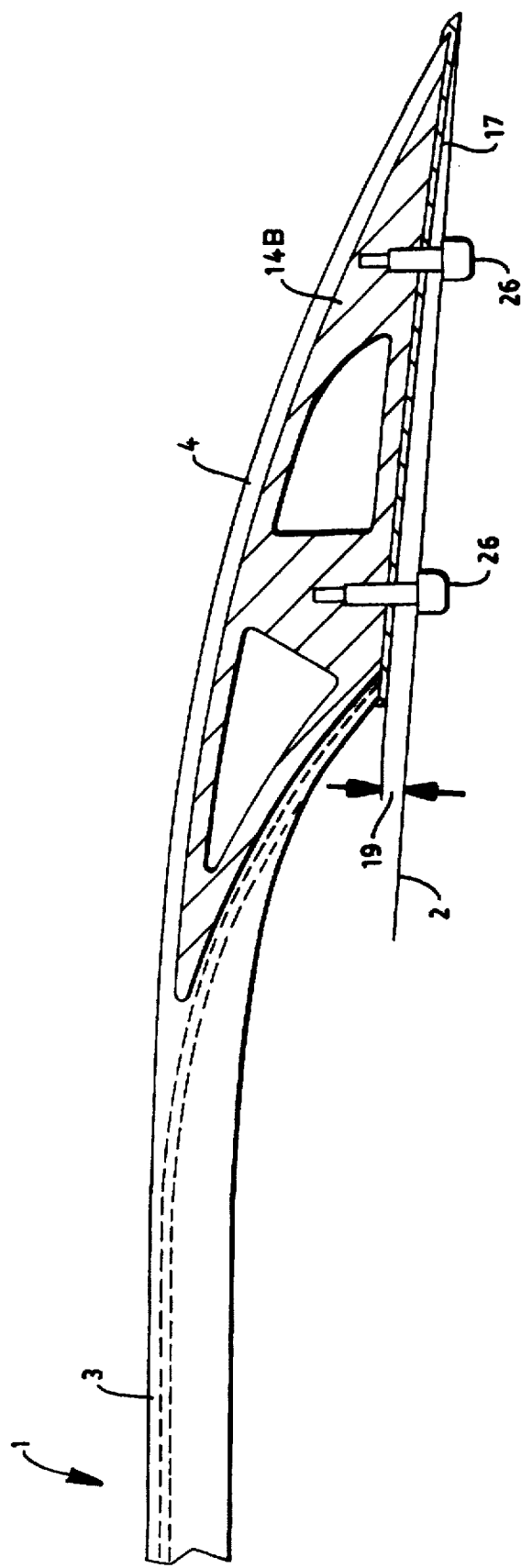
FIG. 7 is a vertical section through the foot area with a variant for absorbing tolerance.

FIG. 7 shows a wedging means for the possibility of tensionable fastening a support part 14B and the roof rail 1. The bottom plate 17 of the inserted support part 14B is directed obliquely, forming a wedge angle 19 of preferably about 1°–3° with the vehicle roof 2. During the tightening of the connection elements 26, the support part 14B is placed flat on the vehicle roof 2 and the beak 15 is rotated downward by the wedge angle. As a result, the beak 15 tensions the narrowed area 16 and presses the foot 4 firmly onto the vehicle roof 2. The cutting line 12 of the hollow chamber section 7 may also extend obliquely to the horizontal or the vehicle roof 2 by the wedge angle 19.

Figure 8:
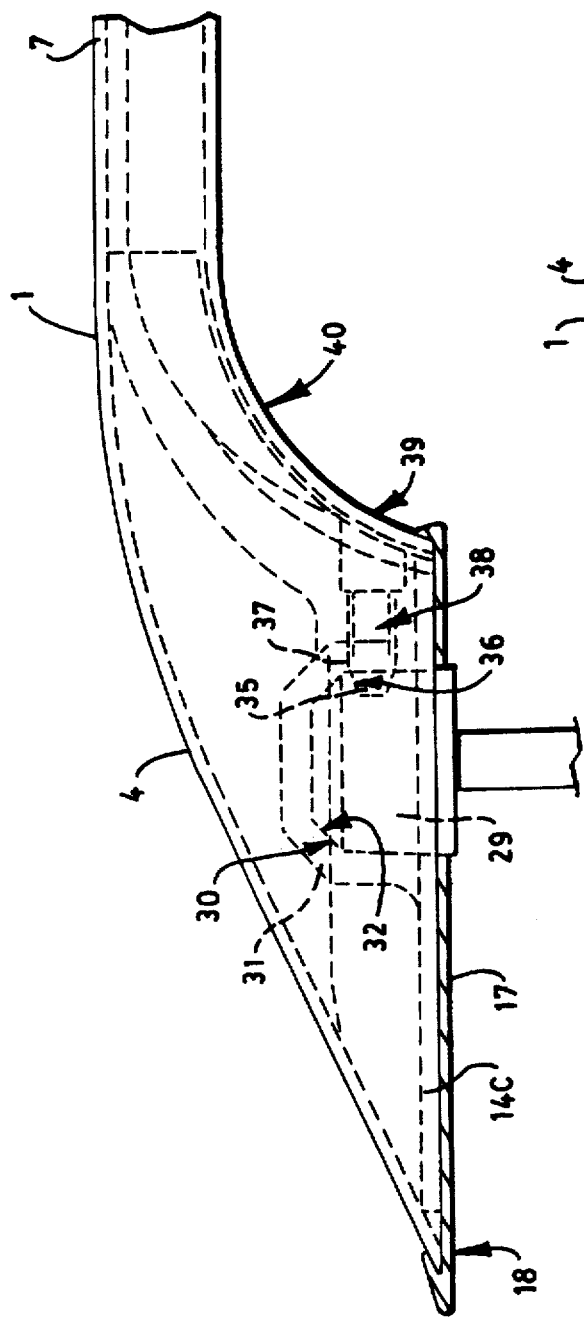
FIG. 8 is a side view of a bent-off rail foot with another variant of its fastening means.

The example in FIG. 8 shows a roof rail 1 at one of its bent-off ends 4, wherein the bent-off end 4 is also the foot of the rail and has a flute-shaped inside 40 of the rail foot.

A metal fitting 14C, which is preferably designed as a casting, is adapted to the inner shape of the rail foot 4, engages the bent-off end 4 of the rail 1 and is preferably welded to the rail foot 4 at 34.

The metal fitting 14C has a mount 31 with a conical hole 32, which is engaged by a connecting pin 29, which is connected to the roof surface 2 and projects over this surface. These connecting pins 29 are factory-installed. The connecting pin 29 has, at least at its free front end, a conical bevel 30, which cooperates with the conical hole 32 of the mount 31. Therefore, the rail 1 with its mounts 31 needs only be pressed onto the projecting connecting pins 29 to fasten the rail 1 to the vehicle roof surface 2.

A locking means is provided to secure the position of the rail 1 on the connecting pins 29. In the exemplary embodiment according to FIG. 9, a conical blind hole 36, which is engaged by a conical end of a locking pin 35 radially to the connecting pin 29, is located on the jacket surface of the connecting pin 29. When this locking pin 35 is guided along its axis in a spring-loaded manner, the locking of the mount 31 on the connecting pin 29 is automatically achieved during the pressing on of the rail 1. However, the locking pin 35 may also be designed as a pin adjustable along its axis and to bring about the blocking of the locked position mechanically.

To achieve this, a threaded set 38 screw is rotatable in the mount 31 radially to the connecting pin 29 in a threaded hole in the exemplary embodiment shown in FIG. 8. A spring 37 is preferably located between the setscrew 38 and the locking pin 35. The locking pin 35 can be blocked or supported in its snapped-in position by means of the setscrew 38.

If the rail 1 is to be detached from the roof surface 2, the setscrew 38 needs only be turned back, so that the locking pin 35 can be removed from the blind hole 36. The rail 1 is then lifted off in the upward direction.

To make the actuation of the setscrew 38 or of the locking pin 35 unrecognizable from the outside, a relatively small access hole 39 is located in the wall of the bent-off rail foot 4, and a special tool, which cooperates with a fitting tool surface of the setscrew 38, can be passed through the small hole 39.

Instead of the small hole 39, a narrow gap is formed between the walls of the hollow section 7, through which the tool can be introduced, if the rail 1 is designed according to FIG. 4.

Figure 9:
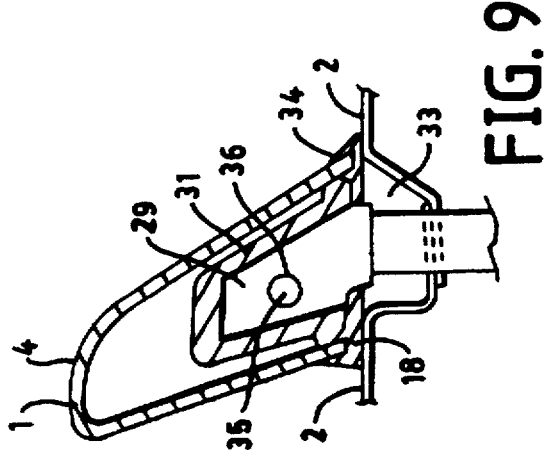
FIG. 9 is a vertical section through a rail foot with an oblique position deviating from the vertical position.

The example in FIG. 9 shows that the connecting pin 29 may be in an oblique position deviating from the vertical direction, and the mount 31 and optionally also the bent-off end 4 (rail foot) of the rail 1 are also in an approximately parallel oblique position.

FIG. 9 also shows that the surface 2 of the vehicle forms a drip molding 33, in which the foot of the connecting pin 29 is located and is fastened on the inside in a manner not shown. In addition, the beveled surface of the rail foot 4 is covered by an elastic bottom plate 17, which is to prevent the rail 1 from being damaged when the rail 1 is placed on the vehicle surface 2.

Figure 10:
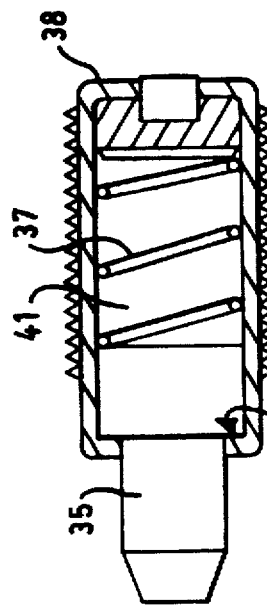
FIG. 10 is a section through a hollow threaded bolt according to FIG. 8 on an enlarged scale.

The design of the locking pin 35 and of the setscrew 38 may be varied in many different ways. For example, the locking pin 35 may be guided in the setscrew 38, as is shown in FIG. 10. The hole 41 for receiving the locking pin 35 is to be provided with a stop shoulder 42 in order to prevent the locking pin 35 from escaping from the hole 41 during the removal of the rail 1. The setscrew 38 is rotatable in a threaded hole of the mount 31 radially to the connecting pin.

The locking pin 35 is removed from the blind hole 36 of the connecting pin 29 when the setscrew 38 is turned back.

The present invention is not limited to the solutions schematically represented in the drawing.

The advantage of the present invention is that the roof rail 1 can be mounted without a tool on the assembly line of the vehicle assembly plant. The lacquer is not damaged during mounting. In addition, the fastening is not visible. Yet, the rail 1 can be removed at any time without damaging the vehicle, and without having to take the vehicle into a shop.

Finally, the present invention is characterized in that the rail 1 can be fastened to the vehicle surface without clearance, because the connecting pins 29 and the mount 31 are beveled in a mutually fitting manner. This results in a setting effect, which reinforces the clearance-free connection of the rail, when a load is placed on the rail 1.

We claim:

1. A roof rail comprising:

a hollow spar with a longitudinal axis;

a foot on one end of said spar, said foot being formed in one piece with said spar and being bent off from said longitudinal axis, said foot having a foot opening obliquely positioned with respect to a curve of said foot and being connectable to a roof surface, said foot and said foot opening defining a foot space;

a spar arch formed in said spar and extending along said longitudinal axis, said spar arch being positioned to have a concavity facing toward the roof surface;

a support part positioned inside said foot opening, said support part being connectable to said foot and the roof surface.

2. A rail in accordance with claim 1, wherein:

said foot opening has an inner foot edge;

said spar arch begins at said inner foot edge and extends to an opposite radial side of said spar to form a beak-shaped area in said foot space.

3. A rail in accordance with claim 2, wherein:

said support part includes a beak part insertable into said beak shaped area of said foot space.

4. A rail in accordance with claim 3, wherein:

said foot includes wedging means for tensioning said beak part in said beak shaped area during fastening of said support part to the roof surface, said wedging means including shaping said foot to position said foot opening at a wedge angle with respect to the roof surface prior to fastening of said support to the roof surface.

5. A rail in accordance with claim 1, further comprising:

a hammer head plate embedded into said spar arch at an intermediate position on said spar;

an intermediate support means for connecting to said hammer head plate and for supporting said spar from the roof surface, said intermediate support means being separate from said spar and positionable on the roof surface.

6. A rail in accordance with claim 1, wherein:

said hollow spar has a tubular cross section and is formed from one of aluminum and aluminum alloy.

7. A rail in accordance with claim 1, wherein:

said hollow spar has a wall thickness, said wall thickness being thinner in an area of said spar arch than a surrounding area.

8. A rail in accordance with claim 1, wherein:

a connecting pin extends from the roof surface, said connecting pin being conically tapered and defining a blind hole;

said support part includes a fitting mount defining a conically tapered hole for receiving said connecting pin, said fitting mount also including a locking pin radially movable with respect to said connecting pin into and out of said blind hole.

9. A rail in accordance with claim 8, wherein:

said fitting mount includes means for biasing said locking pin.

10. A rail in accordance with claim 8, wherein:

said locking pin is supported in said fitting mount by means of a setscrew, said setscrew being adjustable radially with respect to said connecting pin in a threaded hole of said mount, said mount defining a hollow and said locking pin being guided in said hollow;

a spring is arranged between said locking pin and said setscrew for biasing said locking pin.

11. A rail in accordance with claim 8, wherein:

said locking pin and said blind hole are of a fastening conical design.

12. A rail in accordance with claim 10, wherein:

said foot includes a flute shaped inside portion which defines one of an access hole and a narrow gap, said set screw being accessible through said one of said access hole and said gap.

13. A rail in accordance with claim 8, wherein:

said connecting pin extending obliquely from the roof surface;

said conically tapered hole is positioned obliquely from the roof surface.

14. A rail in accordance with claim 1, wherein:

said hollow spar is radially closed and said spar arch maintains an inside of said spar radially closed.

15. A rail in accordance with claim 1, wherein:

said spar arch forms a groove in said spar.

16. A rail in accordance with claim 15, wherein:

said groove has a depth extending radially into said spar.

17. A rail in accordance with claim 15, wherein:

said groove has a length extending axially along said spar.

18. A rail in accordance with claim 1, wherein:

said spar arch is formed in a cross section of said spar.

19. A rail in accordance with claim 18, wherein:

said spar arch and said side walls form hollow wall loops.

20. A roof rail comprising:

a hollow spar with a longitudinal axis;

a foot on one end of said spar, said foot being formed in one piece with said spar and being bent off from said longitudinal axis, said foot having a foot opening obliquely positioned with respect to a curve of said foot and being connectable to a roof surface, said foot and said foot opening defining a foot space;

a spar arch formed in said spar and extending along said longitudinal axis, said spar arch being positioned to have a concavity facing toward the roof surface, said hollow spar having shortened side walls in an area of said spar arch;

a support part positioned inside said foot opening, said support part being connectable to said foot and the roof surface.

* * * * *